(12) United States Patent
Kondogiani

(10) Patent No.: US 12,247,701 B2
(45) Date of Patent: Mar. 11, 2025

(54) SELF-SEALING PRESSURE VESSEL SYSTEMS AND METHODS

(71) Applicant: Noble Gas Systems, Inc., Novi, MI (US)

(72) Inventor: Christopher T. Kondogiani, Novi, MI (US)

(73) Assignee: Noble Gas Systems, Inc., Wixom, MI (US)

(*) Notice: Subject to any disclaimer, the term of this patent is extended or adjusted under 35 U.S.C. 154(b) by 42 days.

(21) Appl. No.: 18/368,842

(22) Filed: Sep. 15, 2023

(65) Prior Publication Data

US 2024/0003500 A1    Jan. 4, 2024

Related U.S. Application Data

(62) Division of application No. 17/370,651, filed on Jul. 8, 2021, now Pat. No. 11,788,689.

(51) Int. Cl.
| | |
|---|---|
| *F17C 13/04* | (2006.01) |
| *F16K 1/30* | (2006.01) |
| *F16K 17/40* | (2006.01) |
| *F17C 1/04* | (2006.01) |
| *F17C 13/00* | (2006.01) |

(52) U.S. Cl.
CPC .............. *F17C 13/04* (2013.01); *F16K 1/308* (2013.01); *F16K 13/04* (2013.01); *F17C 1/04* (2013.01);
(Continued)

(58) Field of Classification Search
CPC ......... F17C 1/04; F17C 13/002; F17C 13/04; F17C 2201/035; F17C 2201/0166; F17C 2201/0147; F17C 2203/0619; F17C 2203/0614; F17C 2209/219; F17C 2250/072; F17C 2250/043;
(Continued)

(56) References Cited

U.S. PATENT DOCUMENTS

| | | |
|---|---|---|
| 2,731,803 A | 1/1956 | Reed |
| 3,797,804 A | 3/1974 | Ashbaugh |

(Continued)

FOREIGN PATENT DOCUMENTS

| | | |
|---|---|---|
| GB | 2062205 A | 5/1981 |
| WO | 2021018563 A1 | 2/2021 |

OTHER PUBLICATIONS

International Search Report and Written Opinion for International Application No. PCT/US2022/036278 dated Oct. 24, 2022.

*Primary Examiner* — Robert J Hicks
(74) *Attorney, Agent, or Firm* — Young Basile Hanlon & MacFarlane, P.C.

(57) ABSTRACT

A compressed gas storage system that includes a pressure vessel. The pressure vessel includes a first vessel portion and a second vessel portion in fluid communication with the first vessel portion. The pressure vessel includes a third vessel portion in fluid communication with the second vessel portion. The compressed gas storage system includes a first valve positioned between the first vessel portion and the second vessel portion and a second valve positioned between the second vessel portion and the third vessel portion. The first valve allows and impedes fluid flow between the first and the second vessel portions. The second valve allows and impedes fluid flow between the second and the third vessel portions.

20 Claims, 10 Drawing Sheets

(52) U.S. Cl.
CPC .... *F17C 13/002* (2013.01); *F17C 2201/0166* (2013.01); *F17C 2201/035* (2013.01); *F17C 2203/0619* (2013.01); *F17C 2205/0335* (2013.01); *F17C 2205/035* (2013.01); *F17C 2205/0397* (2013.01); *F17C 2209/219* (2013.01); *F17C 2250/043* (2013.01); *F17C 2250/0443* (2013.01); *F17C 2250/072* (2013.01); *F17C 2260/036* (2013.01); *F17C 2260/038* (2013.01)

(58) Field of Classification Search
CPC ........ F17C 2250/0443; F17C 2260/036; F17C 2260/038; F17C 2205/0335; F17C 2205/035; F17C 2205/0397; F17C 2205/0323; F16K 1/308; F16K 1/307; F16K 1/304; F16K 1/30; F16K 13/06; F16K 13/04

USPC .... 220/560.03, 589, 203.19, 203.23, 203.24, 220/203.28, 203.01; 251/83, 82, 149.6, 251/149.1, 176, 337; 141/302, 301, 119, 141/116

See application file for complete search history.

(56) References Cited

U.S. PATENT DOCUMENTS

| | | |
|---|---|---|
| 4,449,545 A | 5/1984 | Vernor et al. |
| 5,421,162 A * | 6/1995 | Gustafson ................ F17C 9/02 62/7 |
| 6,206,027 B1 | 3/2001 | Ponnet et al. |
| 2003/0188799 A1 | 10/2003 | Cessac et al. |
| 2004/0163731 A1 | 8/2004 | Eichelberger et al. |
| 2022/0260210 A1 * | 8/2022 | Killeen .................... F17C 5/06 |

* cited by examiner

SELF-SEALING PRESSURE VESSEL SYSTEMS AND METHODS

CROSS-REFERENCE TO RELATED APPLICATIONS

This application is a divisional of U.S. patent application Ser. No. 17/370,651, filed on Jul. 8, 2021, the entire disclosure of which is hereby incorporated by reference.

TECHNICAL FIELD

This disclosure relates to systems and methods for a self-sealing pressure vessel that can be used with compressed fuel storage systems including conformable tank systems.

BACKGROUND

Compressed fluids can be used for a variety of applications. For example, compressed fluids, such as gasses, can be used as a fuel to provide benefits including lower pollution levels and lower refining costs compared to non-compressed fluids, such as gasoline or diesel fuel. When using compressed fluids as a vehicle or machine fuel or for industrial applications, it is desirable that the compressed fluids be transportable, refillable, and safely stored.

The storage of compressed gas, such as hydrogen or compressed natural gas, is particularly challenging, as the compressed gas is typically stored at high-pressure in order to achieve acceptable storage density. Given the high-pressure used to store a sufficient amount of compressed gas, leaks, such as ruptures, can occur. It is desirable to limit compressed gas leaks from affecting an entire storage system and to do so in a simple, reliable and safe manner.

Limitations with conventional compressed gas storage systems exist with respect to how the compressed gas storage system performs when a leak, and in particular a rupture, occurs in a portion of the gas storage system (e.g., tank). Improvements that reduce the loss of gas, and improvements that allow the gas storage system to continue to operate relatively normally in the event of a leak in the storage system, are needed.

SUMMARY

In one aspect, a compressed gas storage system includes a pressure vessel. The pressure vessel includes a first vessel portion and a second vessel portion in fluid communication with the first vessel portion. The pressure vessel includes a third vessel portion in fluid communication with the second vessel portion. The compressed gas storage system includes a first valve positioned between the first vessel portion and the second vessel portion and a second valve positioned between the second vessel portion and the third vessel portion. The first valve allows and impedes fluid flow between the first and the second vessel portions. The second valve allows and impedes fluid flow between the second and the third vessel portions. When the pressure vessel has a rupture within the second vessel portion, the first valve impedes fluid flow from the second vessel portion to the first vessel portion, and the second valve impedes fluid flow from the third vessel portion to the second vessel portion.

In another aspect, a compressed gas storage system has a pressure vessel device including a first vessel portion in fluid communication with a second vessel portion. The compressed gas storage system has a valve separating the first vessel portion and the second vessel portion. The valve includes a first wall defining a first opening and a second wall defining a second opening. The compressed gas storage system includes a flow impeder connected with an inner surface of the pressure vessel device that blocks the first opening or the second opening depending on a state of fluid flow between the first vessel portion and the second vessel portion.

In another aspect, a compressed gas storage system has pressure vessel device including a first vessel portion in fluid communication with a second vessel portion. The compressed gas storage system includes a valve separating the first vessel portion and the second vessel portion. The valve includes a first wall defining a first opening, a second wall defining a second opening, and a flow impeder connected with an inner surface of the pressure vessel device. The flow impeder is blockable against the first opening or the second opening depending on a state of fluid flow between the first vessel portion and the second vessel portion.

Figure 1:
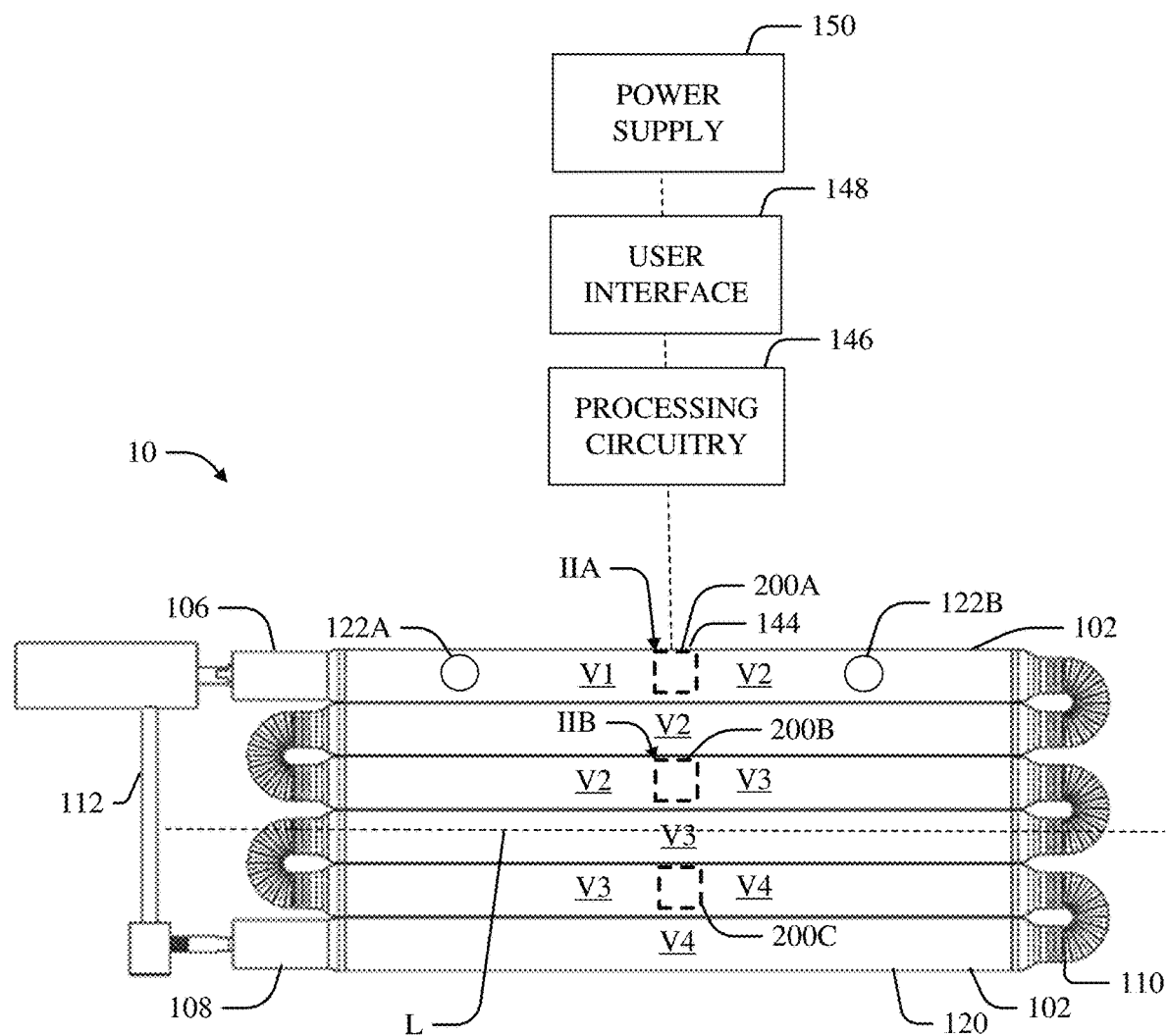
FIG. 1 is a side view of an example of a storage system.

In the drawings, which are not necessarily drawn to scale, like numerals may describe similar components in different views. Like numerals having different letter suffixes may represent different instances of similar components. For example, an element 950 and an element 1050 may describe components that are similar and used in different configurations, and a skilled artisan would understand that the components may be interchangeable. The drawings illustrate generally, by way of example, but not by way of limitation, various examples discussed in the present disclosure.

DETAILED DESCRIPTION

The present disclosure is described with reference to examples of conformable storage systems and methods including multiple vessel portions in fluid communication with one another. Aspects of this disclosure can be used with non-conformable gas storage systems to prevent ruptures and/or leaks of compressed gas. Aspects can be applied to systems having multiple vessel portions arranged in series and can likewise be applied to systems having multiple vessel portions arranged in parallel and fluidly connected by a manifold so that large systems of connected storage tanks can avoid leaking an entire volume of compressed gas where only a single vessel has ruptured. Aspects can also be used with systems including fluids in other states besides gas, such as liquids or liquid/gas mixtures, that are under pressure to avoid leaking an entire volume of liquid, gas, or both in a multi-vessel system.

Examples of storage systems described herein enable a portion of a pressure vessel device experiencing a leak or rupture to automatically seal off from other portions of the pressure vessel device. For example, a vessel portion (e.g., container, canister, tank, cylinder, or portion thereof) that is in fluid communication with another vessel portion can automatically seal off the vessel portion upon occurrence of a leak or rupture in the other vessel portion. Aspects described herein provide a variety of improvements over conventional storage systems including the ability to segregate a leaking or failed portion of the tank. This reduces the amount of gas lost, which reduces the risk of the gas from becoming a safety hazard by leaking out, as well as keeping most of the gas inside the tank. Reducing the amount of gas lost further enables the tank to continue being used until it can be safely repaired.

The present disclosure provides improvements to conformable storage systems by constraining any leaks or ruptures to an affected vessel portion, which inhibits fluid communication between the affected vessel portion(s) and the other vessel portion(s). To inhibit leaking of gas upon a rupture, the system can include aspects described herein, such as the illustrative valve placements and configurations that automatically seal off the affected vessel portion(s) from other vessel portion(s) of the storage system. Aspects described herein provide flexibility in dividing a pressure vessel device into a number of different vessel portions that can "self-seal," that is, fluidly decouple themselves from at least one other vessel portion in the event of a leak or rupture.

FIG. 1 is a side view of an example of a storage system 10. The storage system 10 includes a pressure vessel 102 configured to receive and store a compressed gas. The pressure vessel 102 can include a liner, e.g., underneath a reinforcement layer, such as the liner 514 and the reinforcement layer 516 shown in FIG. 5. The pressure vessel 102 can be positioned in foam or other cushioning material and can be enclosed by a shell, such as the foam 504 and the shell 506 shown in FIG. 5.

The storage system 10 includes end fittings 106, 108 that connect the pressure vessel 102 to valves, adapters, plugs, or couplings and assist in containing the compressed gas within the pressure vessel 102. The end fittings 106, 108 can be employed as inlets or outlets to receive or discharge compressed gas. The pressure vessel 102 can be a conformable type, a non-conformable type, or any other type of compressed fluid storage system or vessel.

The pressure vessel 102 includes bend sections 110 (e.g., bend passages) located between longitudinal sections 120. The longitudinal sections 120 extend along or parallel to an axis L in the example of FIG. 1. The pressure vessel 102 includes a series of the longitudinal sections 120 and the bend sections 110 arranged in an alternating pattern. In some examples, the bend sections 110 can include a corrugated portion that improves the structural stability of the bend sections 110. In other examples, the bend sections 110 may have a diameter that is smaller than a diameter of the longitudinal sections 120.

The storage system 10 includes an auxiliary fluid connection 112 that allows gas to flow between a vessel portion V1 and another vessel portion, such as a vessel portion V4. To inhibit leaks of fluid at a location of ruptures 122A, 122B, the storage system 10 includes the vessel portions V1, V2, V3, V4 separated by respective valves 200A, 200B, 200C. For example, the vessel portion V1 is separated from the vessel portion V2 by the valve 200A. Example types for the valves 200A, 200B, 200C include various two-way check valves (e.g., bidirectional valves), two one-way check valves that independently control flow in different directions, or both. Other types are also possible.

As shown, the auxiliary fluid connection 112 extends between the end fittings 106, 108 to allow fluid communication between the vessel portion V1 and the vessel portion V4, between the end fittings 106, 108, or both, without having to rely on the fluid flow through the vessel portions V2, V3 located therebetween when the ruptures 122A, 122B occur. In other words, if the rupture 122B occurs, the valves 200A and 200B can be closed to isolate the vessel portion V2 while fluid from the vessel portions V1, V3, and V4 can reach the end fittings 106, 108.

The storage system 10 includes aspects to alert a user that one or more ruptures 122A, 122B have occurred. For example, when the rupture(s) 122A, 122B (or other leak sources) occur, a sensor 144 positioned at one or each of the valves 200A, 200B, 200C can detect or otherwise recognize the rupture(s) 122A, 122B, such as by recognizing actuation of one of the valves 200A, 200B, 200C or sensing a change in pressure or flow rate. The sensor 144 can then transmit a failure input to processing circuitry 146 to output an alert to a user. The output can be a visual, tactile, or audible indication via a user interface 148. The sensor 144, the processing circuitry 146, the user interface 148, and a power supply 150 can be in electrical communication to alert the user of the rupture(s) 122A, 122B.

Figure 2A:
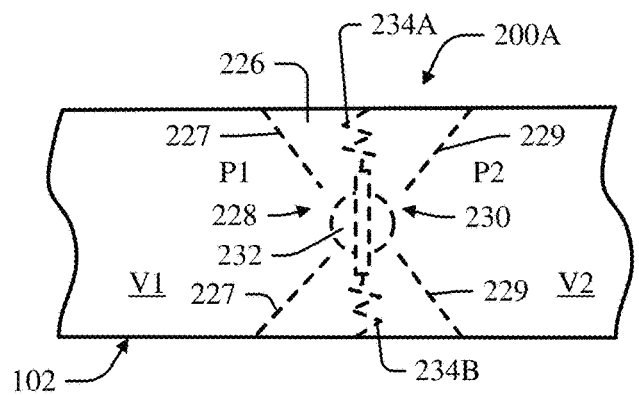
FIG. 2A is a cutout view of the valve in box IIA of the storage system of FIG. 1 in a first state.
Figure 2B:
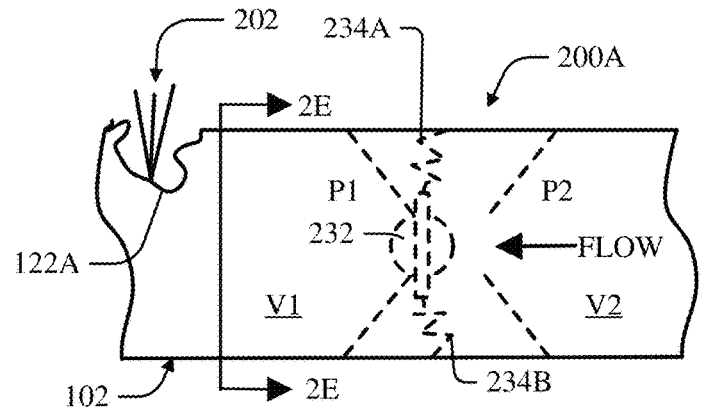
FIG. 2B is a cutout view of the valve of FIG. 2A in a second state.
Figure 2C:
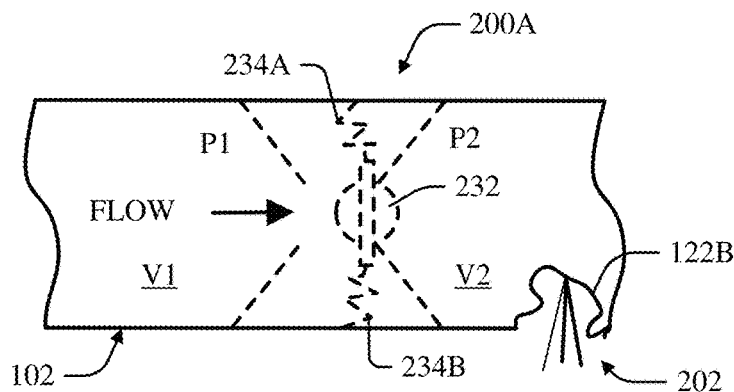
FIG. 2C is a cutout view of the valve of FIG. 2A in a third state.
Figure 2D:
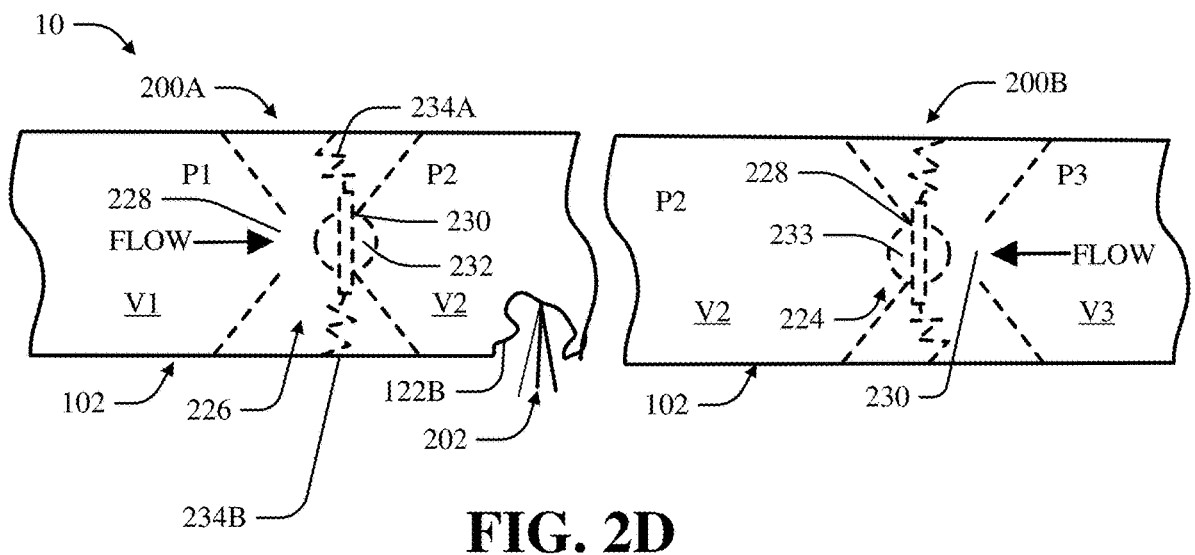
FIG. 2D illustrates two cutout views of the valve and the valve in boxes IIA and IIB of the storage system 10 of FIG. 1.
Figure 2E:
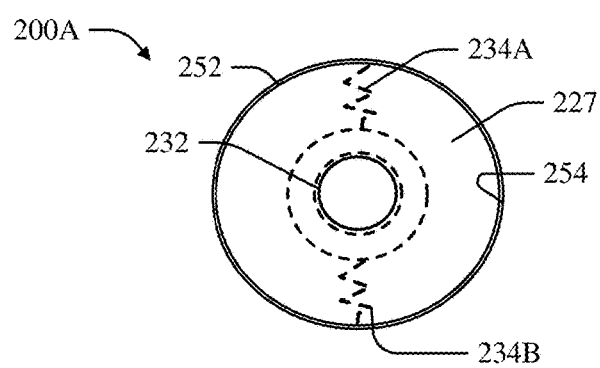
FIG. 2E is a cross-sectional view of the valve of FIGS. 2A to 2D along line 2E-2E through the pressure

FIG. 2A is a cutout view of the valve 200A in box IIA of the storage system 10 of FIG. 1 in a first state (e.g., a normal state or a fill state). FIG. 2B is a cutout view of the valve 200A of FIG. 2A in a second state (e.g., a first vessel portion leak state). FIG. 2C is a cutout view of the valve 200A of FIG. 2A in a third state (e.g., a second vessel portion leak state). FIG. 2D illustrates two cutout views of the valve 200A and the valve 200B in boxes IIA and IIB of the storage system 10 of FIG. 1 where the vessel portion V2 is being automatically sealed off from the vessel portions V1, V3 in the event of the rupture 122B in the vessel portion V2 (e.g., as consistent with FIG. 2C). FIG. 2E is a cross-sectional view of the valve 200A of FIGS. 2A to 2D along line 2E-2E through the pressure vessel 102. FIGS. 2A-2E are described together with support from FIG. 1 for ease of describing various scenarios or mechanical set ups that prevent total leaks of the compressed gas in the storage system 10.

As shown in FIGS. 1 and 2A-2D, the vessel portion V1 is in fluid communication with the vessel portion V2. The valve 200A is located inside (e.g., within the liner (e.g., 514, FIG. 5)) of a channel or hollow of the pressure vessel 102 between and in fluid communication with the vessel portions V1, V2. The valve 200A can be fixed to the liner by any suitable means, such as by a mechanical coupling, press-fit, ultrasonic welding, or adhesive. As shown in FIG. 2A, in a normal state, the valve 200A allows free fluid flow between the vessel portions V1, V2. As shown in FIG. 2B, when the rupture 122A occurs in the vessel portion V1, a leak 202 of fluid occurs from the rupture 122A in the vessel portion V1, and the valve 200A is pulled toward the vessel portion V1 to impede fluid flow from the vessel portion V2 to the vessel portion V1 so that fluid from the vessel portion V2 remains contained within the storage system 10. In a similar manner, as shown in FIG. 2C, when the rupture 122B occurs and the leak 202 of fluid occurs from the rupture 122B in the vessel portion V2, the valve 200A is pulled toward the vessel portion V2 to impede fluid flow from the vessel portion V1 to the vessel portion V2 so that fluid is not lost from the vessel portion V1.

FIG. 2D illustrates the example of FIG. 2C and further shows what happens when the rupture 122B occurs in the vessel portion V2 of FIG. 2C with respect to the vessel portion V1 and the vessel portion V3 (shown in FIGS. 1 and 2D). As shown in FIGS. 1 and 2D, the vessel portion V2 can be located in between the vessel portions V1, V3, that is, in series between the vessel portions V1, V3. Under normal operation, the vessel portion V3 is in fluid communication with the vessel portions V1, V2. To distinguish the vessel portions V1, V2, V3, V4, the valve 200A separates the vessel portions V1, V2; the valve 200B separates the vessel portions V2, V3; and the valve 200C separates the vessel portions V3, V4.

Upon the rupture 122B occurring in the vessel portion V2, the valve 200A moves to the right (FIG. 2D) to inhibit fluid flow from the vessel portion V1 to the vessel portion V2, and the valve 200B moves to the left to impede fluid flow from the vessel portion V3 to the vessel portion V2. In other words, the rupture 122B that occurs in the vessel portion V2, which is located in series between the vessel portion V1 and the vessel portion V3, can cause the vessel portion V2 to be automatically sealed off from the vessel portions V1, V3. Because the vessel portion V2 is automatically sealed off (e.g., instantaneously, substantially instantaneously, such as between 0.01-1 second or automatically sealed without input from a processor or sensors) from the vessel portions V1, V3, the leak 202 (e.g., of gas or other fluid) does not cause emptying of the vessel portions V1, V3. That is, loss of fluid from the vessel portions V1, V3 is inhibited, minimized, mitigated, or otherwise prevented. Any number of vessel portions and any number of valves can be provided, and the valves 200A, 200B, 200C can be identical or different so long as the leak 202 is mitigated or prevented between vessel portions (e.g., from vessel portion V1 to vessel portion V2). The valves 200A, 200B, 200C can separate smaller portions of the vessel portions V1, V2, V3, V4; for example, a valve can be positioned within each longitudinal section 120 (FIG. 1) to split each of the longitudinal sections 120 into a first half and a second half.

The valve 200A can be any suitable valve or valves configured to prevent a total leak of all fluids or gases from the storage system 10. The valve 200A includes a chamber 226 defined by a first wall 227 having a first opening 228 and a second wall 229 having a second opening 230 (FIG. 2A), which allows two way fluid flow between the vessel sections V1, V2, V3, V4.

As shown in FIG. 2E, a perimeter 252 of the first wall 227 is in contact with an inner surface 254 of the vessel portion V1 (e.g., attached with a liner) to create the chamber 226 between the first wall 227 and the second wall 229 (FIG. 2A). FIGS. 2B and 2E show a flow impeder 232 blocking the first opening 228 of the first wall 227 so that no fluids are communicable between the vessel portions V1, V2 when the rupture 122A is present. The flow impeder 232 (e.g., at least one flow impeder or flow blocker) is located within the chamber 226 (FIG. 2A) to prevent or allow fluid flow through either the first or the second opening 228, 230. The flow impeder 232 can be configured to move and impede (e.g., inhibit or block) fluid flow through the first opening 228 or the second openings 230 (FIG. 2A) based on a flow direction, a flow rate, or a pressure differential (e.g., P1<<P2 or P1>>P2) between the vessel portions V1, V2. The first and second walls 227, 229 are shaped as inward facing cones (FIG. 2A) to allow the flow impeder 232 to block the first and second openings 228, 230 (FIG. 2A). In other configurations, the first and second walls 227, 229 may have any shape sufficient to define the first and second openings 228, 230 and allow the flow impeder 232 to block either of the openings 228, 230 in the event of a rupture (e.g., the ruptures 122A, 122B).

The flow impeder 232 is attached to resilient members 234A, 234B, such as springs, shown in dashed lines in FIG. 2E as present behind the wall 227 in this view. The resilient members 234A, 234B are tuned to allow the flow impeder 232 to move at a specified pressure differential (or a specified magnitude of a leak or rupture, specified flow rate, or other suitable characteristic) to block the first or second opening 228, 230. For example, as shown in FIG. 2A, when the pressure P1 in the vessel portion V1 is equal to the pressure P2 in the vessel portion V2 (e.g., no flow, substantially no flow, static condition, or fill condition), the flow impeder 232 does not move to a position to block the first or the second opening 228, 230. If the storage system 10 is filled with compressed fluid, and P1 is higher but not substantially higher than P2 (e.g., P1>P2), the flow impeder 232 can be tuned so that that the resilient members 234A, 234B do not allow the flow impeder 232 to inhibit fluid flow through either of the first or the second openings 228, 230. In such a state, for example, during fill of the pressure vessel 102, the flow rate between the vessel portions V1, V2 is not zero, but the flow rate is also not high enough to trigger movement of the flow impeder 232 into a blocking position.

During the fill state or a discharge state (i.e., a controlled release of compressed fluids), the rate of filling or discharge may be limited to avoid temperature of the pressure vessel 102 being above or below a predetermined range. The temperature inside the pressure vessel 102 may be achieved during the fill state or the discharge state as a function of a rate at which the pressure vessel 102 is filled or discharged. If the temperature of the pressure vessel 102 is above or below the predetermined range, the pressure vessel 102 may be damaged and cause one or more vessel portions (e.g., V1, V2, V3, V4) to be compromised. Accordingly, the flow impeder 232 may be tuned to prevent the pressure vessel 102 from being filled or discharged above a threshold rate so that the temperature of the pressure vessel 102 is not above or below the predetermined range. For example, when the threshold rate of filling or discharging is exceeded, the flow impeder 232 may block the first and/or second openings 228, 230, depending on a direction of fluid flow, to avoid an undesirable raising or lowering of the temperature outside the predetermined range. The threshold rate may be about 0 grams per second to about 25 grams per second. Regarding temperature, the predetermined range may be about −40 degrees Celsius to about 85 degrees Celsius. In addition, by limiting the threshold rate of filling or discharging, an extreme discharge of fluids may be avoided at a leak that is unknown and present in the pressure vessel 102 when the pressure vessel 102 is being initially filled or discharged.

As shown in FIG. 2B, when the rupture 122A occurs in the vessel portion V1, the pressure P1 in the vessel portion V1 drops, causing an increased flow rate and pressure differential between the vessel portions V1, V2. Almost instantaneously, a pressure differential (e.g., P1<<P2) or flow rate is created that exceeds a specified, pre-determined threshold (e.g., a fluid flow threshold) sufficient to overcome inertia of the resilient members 234A, 234B, and the resilient members 234A, 234B allow the flow impeder 232 to move toward and close the first opening 228.

FIG. 2C shows an example where the rupture 122B is located in the vessel portion V2 and causes the flow impeder 232 to move and block the second opening 230. In the example of FIG. 2C, the fluid flow threshold that causes the flow impeder 232 to block the second opening 230 can be tuned to a higher threshold than the pressure differential (e.g., P1>>P2) that occurs during a fill operation so that the flow impeder 232 is not activated in a fill state. With this technique, the resilient members 234A, 234B that are coupled to the flow impeder 232, such as at a ring (shown in dashed line) extending outwardly from a surface of the flow impeder 232, can be tuned to activate and move the flow impeder 232 to close the second opening 230 upon a leak or the rupture 122B occurring in the vessel portion V2 (FIG. 2C).

In the case of a leak or the rupture 122B, the flow rate can increase instantaneously, which causes the pressure P1 in the vessel portion V1 to be significantly higher than the pressure P2 in the vessel portion V2 (e.g., P1>>P2) as compared to a fill state (e.g., P1>P2 or P1=P2). The valve 200A can be tuned such that the valve 200A does not actuate until the flow rate is about 2 times the maximum fill rate. This change may occur in a very short amount of time, such as less than 1 second. In an example system, in a fill state, a maximum flow rate can be about 15 grams/second. Therefore, the flow rate that actuates the valve 200A can be about 30 grams/second or in a range between 20-40 grams/second. In other example systems, depending on the fluid that the system is designed for, a maximum flow rate in a fill state can be much lower or much higher than the ranges stated above, and therefore, the valve 200A can actuate at lower or higher flow rates than 20-40 grams/second.

FIG. 2D shows the rupture 122B in the vessel portion V2. As the gas leaks 202 out of the rupture 122B in the vessel portion V2, the pressure P2 in the vessel portion V2 can drop substantially while the fluid in the vessel portions V1, V3 attempts to flow (e.g., move) to the lower pressure environment P2 in the vessel portion V2 because of the pressure differential P1>>P2 and P3>>P2. In some examples, using two-way check valves for the valves 200A, 200B, 200C between the vessel portions V1, V2, V3, V4 can prevent the loss of fluid and maintain the integrity of the storage system 10. With this technique, the affected vessel portion (e.g., the vessel portion V2 in FIG. 2D) is effectively automatically sealed off from the unaffected vessel portions V1, V3 by the first flow impeder 232 that closes the second opening 230 in the valve 200A and a second flow impeder 233 that closes the first opening 228 in the valve 200B.

In addition, as shown in FIG. 1, an auxiliary fluid connection 112 can fluidly connect the vessel portions V1, V3 (via the vessel portion V4) without requiring flow through the vessel portion V2 that includes the rupture 122B. The presence of the auxiliary fluid connection 112 facilitates continued fluid flow between the unaffected vessel portions V1, V3, V4 of the storage system 10 and the end fittings 106, 108 of the storage system 10 so that operation can continue while the rupture 122B is present.

Figure 3A:
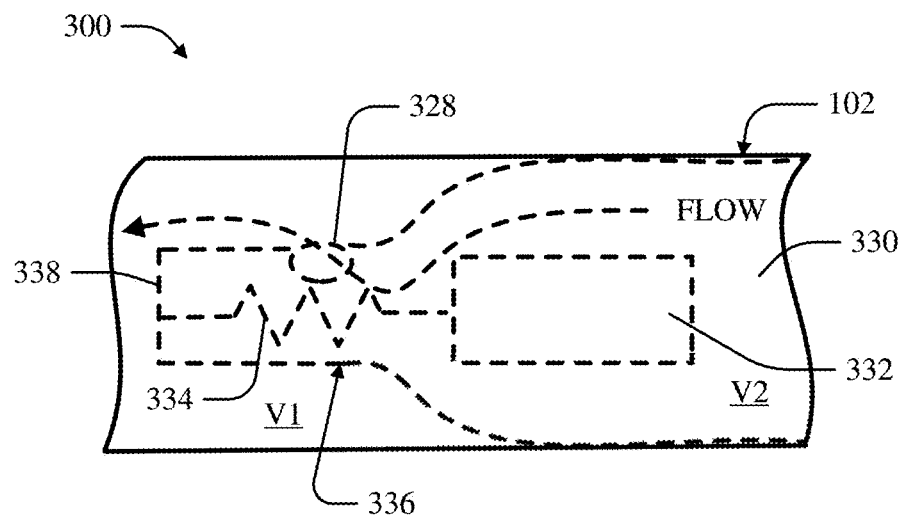
FIG. 3A is a cutout view of another valve usable in box IIA of the storage system of FIG. 1 in a first state.
Figure 3B:
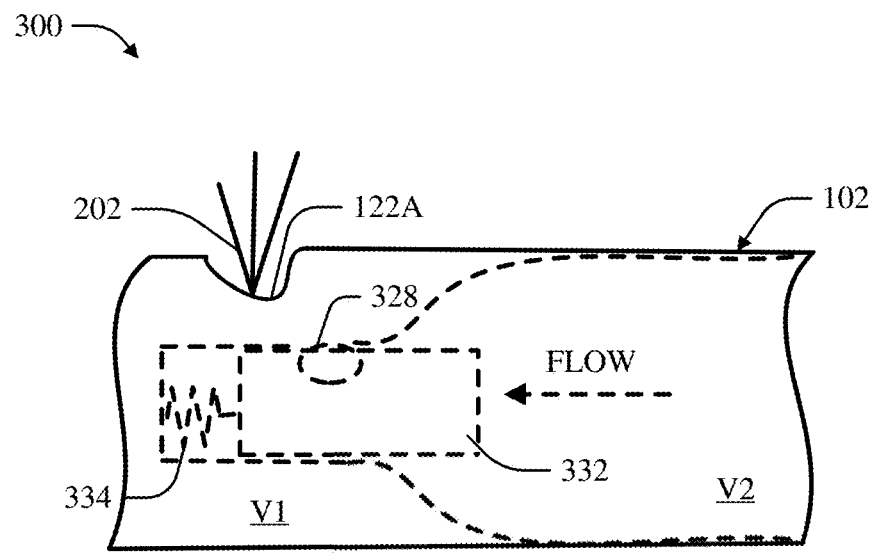
FIG. 3B is a cutout view of the valve of FIG. 3A in a second state.

FIG. 3A is a cutout view of another valve 300 usable in box IIA of the storage system 10 of FIG. 1 in a first state (e.g., a normal state or a fill state). FIG. 3B is a cutout view of the valve 300 of FIG. 3A in a second state (e.g., a leak state). The valve 300 can function in a manner similar to and have similar components as the valves 200A, 200B, 200C of FIGS. 1-2E. The storage system 10 can include any number of valves 300 in combination or separately from the valves 200A, 200B, 200C. For example, the storage system 10 can have a valve of one type, such as the valve 200A of FIGS. 2A-2E, and another valve of another type, such as the valve 300 (e.g., in the position of valve 200C) of FIGS. 3A-3B. The storage system 10 may include any other valve having the functions described herein separately or in combination with the valves 200A, 200B, 200C, 300.

The valve 300 can be located within and coupled to the liner of the pressure vessel 102 to regulate the flow of fluids. The valve 300 includes a first opening 328, a second opening 330, a flow impeder 332, a resilient member 334, a closed end 338, and an enclosure 336, which in combination control the flow of fluids in normal operating conditions and under a situation where a leak is present.

The flow impeder 332 is configured to move and/or inhibit (e.g., impede) fluid flow through the first opening 328 based on a pressure differential (e.g., P1<<P2) or a fluid flow between the vessel portions V1, V2 surpassing, traversing, or otherwise exceeding a fluid flow threshold. The fluid flow threshold can be based on a magnitude of flow between the vessel portions V1, V2 or a difference in pressure between the vessel portions V1, V2. For example, the storage system 10 and/or the pressure vessel 102 that holds about 3 kilograms of compressed gas would have a threshold flow rate of about 17 grams per second to allow filling in approximately 3 minutes to occur. During operation, the discharge rate will be much lower than the threshold flow rate. During a failure event, the expected flow rate from the storage system 10 and/or the pressure vessel 102 could be about two times or more of the threshold flow rate (e.g., 30 grams per second or higher), which would trigger the flow impeder 332 to block the opening 328. The flow impeder 332 is attached to the resilient member 334, such as a spring. The resilient member 334 is tuned to allow the flow impeder 332 to move at a specified pressure differential (e.g., P1<<P2), a specified magnitude of a leak or rupture, or a specified flow rate between the vessel portions V1, V2 to block the first opening 328 and stop fluid flow between the vessel portions V1, V2.

As shown in FIG. 3A, the resilient member 334 can be attached to the closed end 338 of the valve 300. The enclosure 336 has a bottle-like shape that is designed to house the flow impeder 332 when the rupture 122A occurs. The enclosure 336 may have any other shape sufficient to house the flow impeder 332 when the rupture 122A occurs in order to prevent or limit fluid loss from the vessel portion V2 (or any other vessel portion not shown) when the vessel portion V1 has the rupture 122A (FIG. 3B). Except at the opening 328, fluids are prevented from flowing between the vessel portions V1, V2 by the enclosure 336.

When the pressure P1 in the vessel portion V1 is equal to the pressure P2 in the vessel portion V2 (e.g., no flow, substantially no flow, static condition, fill condition), the flow impeder 332 does not move to a position to block the first opening 328. If the storage system 10 is being filled with compressed gas and P1 is not substantially higher than P2 (e.g., P1>P2), the flow impeder 332 can be tuned so that that the resilient member 334 does not allow the flow impeder 332 to inhibit flow through the first opening 328. In such a state, e.g. a fill state or a normal state, the flow rate between the vessel portions V1, V2 is not zero, but the flow rate is not high enough to move the flow impeder 332 into a blocking position.

During the fill state or a discharge state (i.e., a controlled release of compressed fluids), the rate of filling or discharge may be limited to avoid temperature of the pressure vessel 102 being above or below a predetermined range. The temperature inside the pressure vessel 102 may be achieved during the fill state or the discharge state as a function of a rate at which the pressure vessel 102 is filled or discharged. If the temperature of the pressure vessel 102 is above or below the predetermined range, the pressure vessel 102 may be damaged and cause one or more vessel portions (e.g., V1, V2, V3, V4) to be compromised. Accordingly, the flow impeder 332 may be tuned to prevent the pressure vessel 102 from being filled or discharged above a threshold rate so that the temperature of the pressure vessel 102 is not above or below the predetermined range. For example, when the threshold rate of filling or discharging is exceeded, the flow impeder 332 may block the first and/or second openings 328, 330, depending on a direction of fluid flow, to avoid an undesirable raising or lowering of the temperature outside the predetermined range. The threshold rate may be about 0 grams per second to about 25 grams per second. Regarding temperature, the predetermined range may be about −40 degrees Celsius to about 85 degrees Celsius. In addition, by limiting the threshold rate of filling or discharging, an extreme discharge of fluids may be avoided at a leak that is unknown and present in the pressure vessel 102 when the pressure vessel 102 is being initially filled or discharged.

In other examples, as shown in FIG. 3B, when the rupture 122A occurs in the vessel portion V1, the pressure P1 in the vessel portion V1 drops, causing an increased flow rate and pressure differential between the vessel portions V1, V2. Almost instantaneously, a specified pressure differential (e.g., P1<<P2) or flow rate is created that exceeds a specified, predetermined threshold (e.g., a fluid flow threshold) sufficient to overcome inertia of the resilient member 334, and the resilient member 334 compresses such that the flow impeder 332 moves toward and closes the first opening 328 (i.e., in a blocking position). With this technique, the vessel portion V2 is sealed off from the rupture 122A in the vessel portion V1 to minimize a volume of the leak 202 and maintain operation of the storage system 10.

Figure 4A:
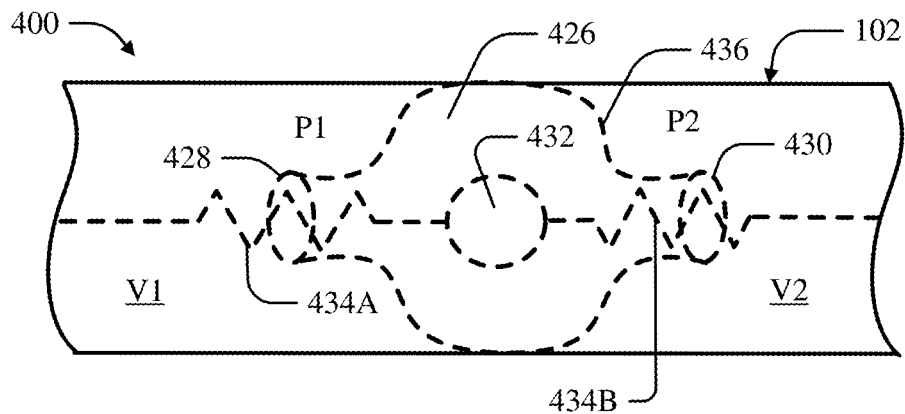
FIG. 4A is a cutout view of another valve usable in box IIA of the storage system of FIG. 1 in a first state.
Figure 4B:
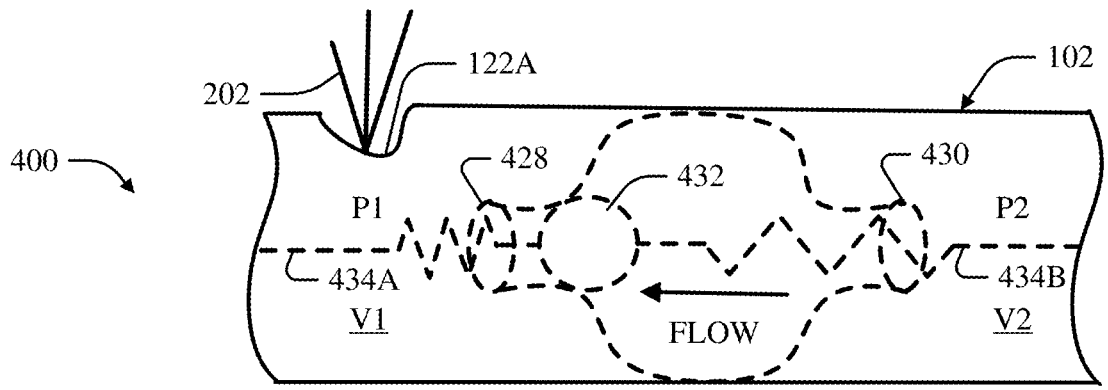
FIG. 4B is a cutout view of the valve of FIG. 4A in a second state.
Figure 4C:
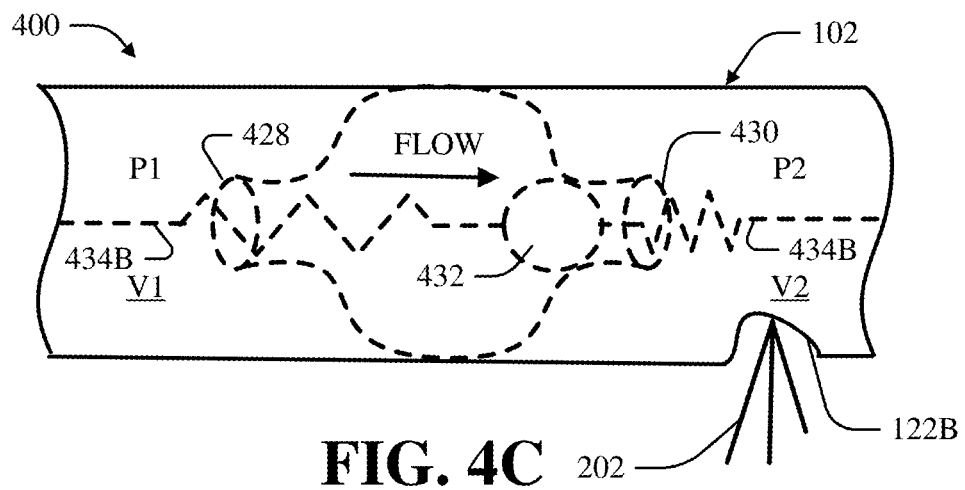
FIG. 4C is a cutout view of the valve of FIG. 4A in a third state.

FIG. 4A is a cutout view of another valve 400 usable in box IIA of the storage system 10 of FIG. 1 in a first state (e.g., a normal state or a fill state). FIG. 4B is a cutout view of the valve 400 of FIG. 4A in a second state (e.g., a first vessel leak state). FIG. 4C is a cutout view of the valve 400 of FIG. 4A in a third state (e.g., a second vessel leak state). The valve 400 is positioned inside (e.g., within the liner or in a channel or hollow) the pressure vessel 102 between and in fluid communication with the vessel portions V1, V2. The valve 400 may function similarly to valves 200A, 200B, 200C, 300 of FIGS. 1-3B.

The valve 400 includes an enclosure 436 forming a chamber 426 having a first opening 428 and a second opening 430 that allow fluids to flow between the vessel portions V1, V2. A flow impeder 432 (e.g., one or more flow impeders) is configured to move and/or inhibit fluid flow through one of the first or second openings 428, 430 based on a pressure differential (e.g., P1<<P2 or P1>>P2) or a fluid flow between the vessel portions V1, V2 surpassing, traversing, or otherwise exceeding a fluid flow threshold. The fluid flow threshold can be based on a magnitude of flow between the vessel portions V1, V2 or a difference in pressure between the vessel portions V1, V2. The flow impeder 432 is attached to resilient members 434A, 434B that have an adjustable configuration, such as springs. The resilient members 434A, 434B are tuned to allow the flow impeder 432 to move at a specified pressure differential (e.g., P1<<P2), a specified magnitude of a leak or rupture, or a specified flow rate between the vessel portions V1, V2 to block the first opening 428 (or the second opening 430) and stop fluid flow between the vessel portions V1, V2.

The enclosure 436 can have another shape, such as a diamond, that includes the two openings 428, 430 that are blockable by the flow impeder 432. The enclosure 436 may have any other shape sufficient to house the flow impeder 432 when the rupture 122A occurs in order to prevent or limit fluid loss from the vessel portions V1, V2 (or any other vessel portion not shown) when the vessel portion V1 has the rupture 122A (FIG. 4B) or when the vessel portion V2 has the rupture 122B (FIG. 4C). Except at the first and the second openings 428, 430, fluids are prevented from flowing between the vessel portions V1, V2 by the flow impeder 432 when one of the ruptures 122A, 122B has occurred in either of the vessel portions V1, V2.

When the pressure P1 in the vessel portion V1 is equal to the pressure P2 in the vessel portion V2 (e.g., no flow, substantially no flow, a static condition, or a fill condition), the flow impeder 432 does not move to a position to block the first opening 428 (e.g., FIG. 4A). If the storage system 10 is being filled with compressed fluid and P1 in the vessel portion V1 is not substantially higher than P2 in the vessel portion V2 (e.g., P1>P2), the flow impeder 432 can be tuned so that that the resilient members 434A, 434B do not allow the flow impeder 432 to inhibit flow through the first opening 428. In such a state (e.g. a fill state or a normal state), the flow rate between the vessel portions V1, V2 is not zero, but the flow rate is not high enough to move the flow impeder 432 into a blocking position.

During the fill state or a discharge state (i.e., a controlled release of compressed fluids), the rate of filling or discharge may be limited to avoid temperature of the pressure vessel 102 being above or below a predetermined range. The temperature inside the pressure vessel 102 may be achieved during the fill state or the discharge state as a function of a rate at which the pressure vessel 102 is filled or discharged. If the temperature of the pressure vessel 102 is above or below the predetermined range, the pressure vessel 102 may be damaged and cause one or more vessel portions (e.g., V1, V2, V3, V4) to be compromised. Accordingly, the flow impeder 432 may be tuned to prevent the pressure vessel 102 from being filled or discharged above a threshold rate so that the temperature of the pressure vessel 102 is not above or below the predetermined range. For example, when the threshold rate of filling or discharging is exceeded, the flow impeder 432 may block the first and/or second openings 428, 430, depending on a direction of fluid flow, to avoid an undesirable raising or lowering of the temperature outside the predetermined range. The threshold rate may be about 0 grams per second to about 25 grams per second. Regarding temperature, the predetermined range may be about −40 degrees Celsius to about 85 degrees Celsius. In addition, by limiting the threshold rate of filling or discharging, an extreme discharge of fluids may be avoided at a leak that is unknown and present in the pressure vessel 102 when the pressure vessel 102 is being initially filled or discharged.

In other examples, such as the example shown in FIG. 4B, when the rupture 122A occurs in the vessel portion V1, the pressure P1 in the vessel portion V1 drops, causing an increased flow rate and pressure differential between the vessel portions V1, V2. Almost instantaneously, a pressure differential (e.g., P1<<P2) or flow rate is created that exceeds a specified, predetermined threshold (e.g., a fluid flow threshold) sufficient to overcome inertia of the resilient members 434A, 434B, and the resilient member 434A compresses while the resilient member 434B expands such that the flow impeder 432 moves toward and closes the first opening 428 (i.e., in a blocking position). With this technique, the vessel portion V2 is sealed off from the rupture 122A in the vessel portion V1 to minimize a volume of the leak 202 and maintain operation of the storage system 10.

In another example, such as the example shown in FIG. 4C, when the rupture 122B occurs in the vessel portion V2, the pressure P2 in the vessel portion V2 drops, causing an increased flow rate and pressure differential between the vessel portions V1, V2. Almost instantaneously, a pressure differential (e.g., P1>>P2) or flow rate is created that exceeds a specified, predetermined threshold (e.g., a fluid flow threshold) sufficient to overcome inertia of the resilient members 434A, 434B, and the resilient member 434B compresses while the resilient member 434A expands such that the flow impeder 432 moves toward and closes the second opening 430 (i.e., in a blocking position). With this technique, the vessel portion V1 is sealed off from the rupture 122B in the vessel portion V2 to minimize a volume of the leak 202 and maintain operation of the storage system 10.

Figure 5:
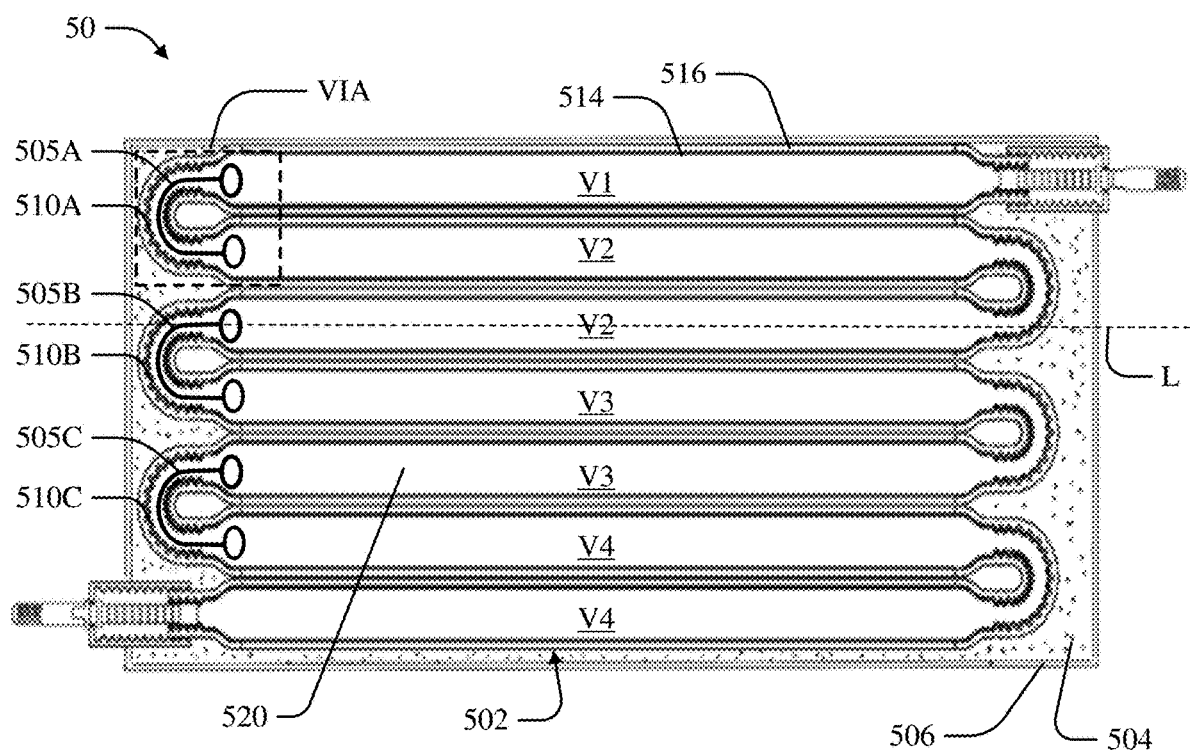
FIG. 5 illustrates a second example of a storage system.

FIG. 5 illustrates a second example of a storage system 50. The storage system 50 of FIG. 5 can be similar to the storage system 10 of FIG. 1. Like the storage system 10, the storage system 50 inhibits or mitigates fluid leaking upon a leak or rupture occurring in a portion of the storage system 50. The storage system 50 includes a pressure vessel 502 configured to receive and store a fluid in a compressed state. The pressure vessel 502 can be located in foam 504 enclosed by a shell 506 that protects the pressure vessel 502 from undesired movement or damage. Within the pressure vessel 502, valves 505A, 505B, 505C are included within bend sections 510A, 510B, 510C to control fluid flow between vessel sections V1, V2, V3, V4 of the pressure vessel 502.

In a design similar to the pressure vessel 102 of FIG. 1, the pressure vessel 502 includes a liner 514 underneath a reinforcement layer 516. The liner 514 and/or the reinforcement layer 516 may be formed of any suitable materials such as metal, plastic, glass, natural or synthetic fibers, rubbers, or any other arrangement sufficient to retain fluid that is compressed. In some examples, the reinforcement layer 516 can be a described as a fiber layer that strengthens the liner 514. In some examples, the reinforcement layer 516 can be a braiding treatment applied to all or a portion of an exterior of the pressure vessel 502. The braiding treatment can be applied by encasing the pressure vessel 502 in high strength fiber material, such as rayon, nylon, glass, or aramid, or any combination thereof, to form the reinforcement layer 516 overlapping the liner 514. Other treatments for the reinforcement layer 516, such as carbon fiber or glass fiber overbraids or sleeves are also possible. In some examples, the storage system 10 can be a conformable storage system, a type III system, or a type IV system. The pressure vessel 502 of the storage system 10 can be formed, at least in part, by extrusion. Aspects described herein can be employed in other types of storage systems having a plurality of vessel portions.

In some examples, longitudinal sections 520 of the pressure vessel 502 can extend along or parallel to a longitudinal direction indicated by an axis L and can include the bend sections 510A, 510B, 510C located between the longitudinal sections 520 so that each of the longitudinal sections 520 is in fluid communication with the preceding and succeeding the longitudinal sections 520 by way of the bend sections 510A, 510B, 510C.

As shown in FIG. 5, the valve 505A is located in the bend section 510A between the vessel portions V1, V2. Likewise, the valve 505B is located in the bend section 510B between the vessel portions V2, V3. The valve 505C is located in the bend section 510C between the vessel portions V3, V4. Any number of vessel portions and valves can be provided, and combinations of the storage systems 10, 50, including a valve (e.g., the valve 200A of FIGS. 2A-2E) located in one or more of the longitudinal sections 520 and another valve (e.g., the valve 505B of FIG. 5) located in the bend section 510B, are within the scope of this disclosure. In some examples, the storage system 50 can also include an auxiliary fluid connection (e.g., the auxiliary fluid connection 112 of FIG. 1) to fluidly couple the end fittings 106, 108, as shown and described in the storage system 10 of FIG. 1.

Figure 6A:
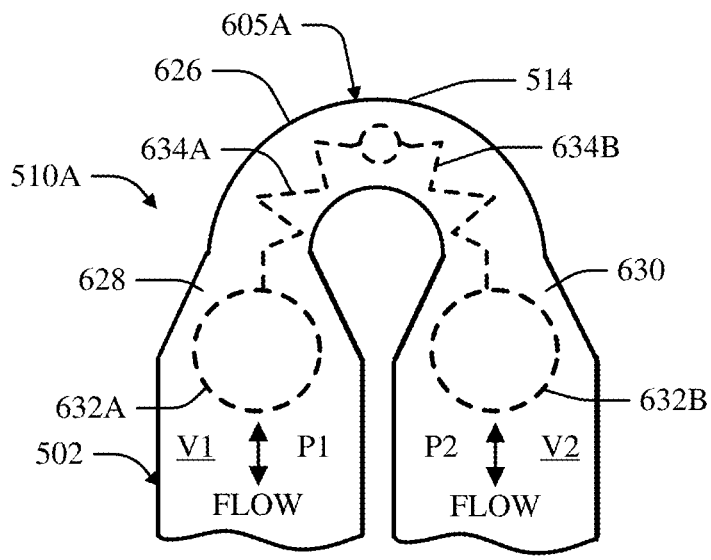
FIG. 6A is a cutout view of a valve in a first state.
Figure 6B:
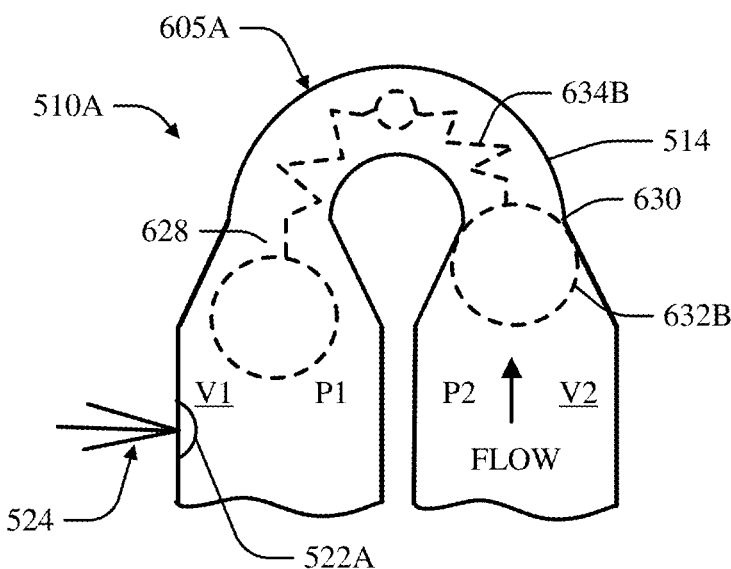
FIG. 6B is a cutout view of the valve in a second state.
Figure 6C:
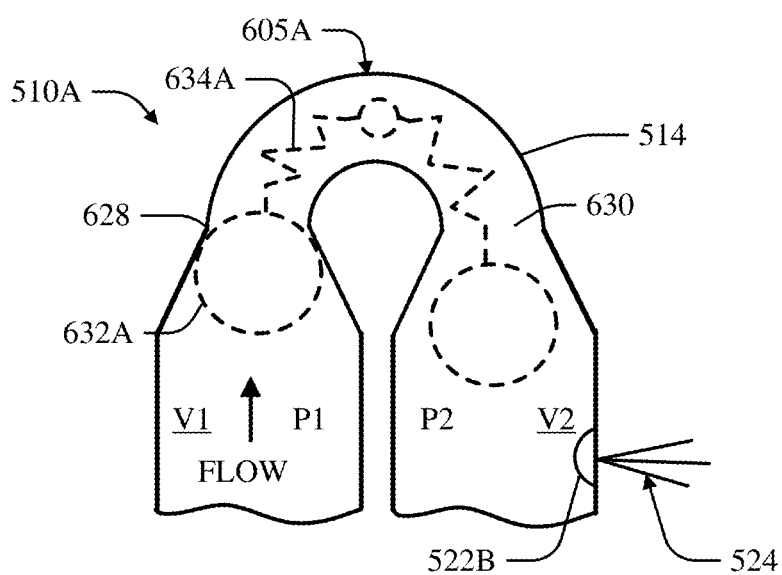
FIG. 6C is a cutout view of the valve in a third state.

FIG. 6A is a cutout view of a valve 605A in a first state. The valve 605A may be similar to the valve 505A of FIG. 5, that is, useable in box IVA of FIG. 5. FIG. 6B is a cutout view of the valve 605A in a second state. FIG. 6C is a cutout view of the valve 605A in a third state. FIGS. 6A-6C are described in tandem to illustrate changes to the valve 605A when the pressure vessel 502 has ruptures 522A, 522B in various locations that can be addressed by use of the valve 605A.

The valve 605A is located inside the liner 514 of the pressure vessel 502 between and in fluid communication with the vessel portions V1, V2. The valve 605A is secured to the liner 514 by any suitable means, such as by a mechanical coupling, a press-fit, an ultrasonic weld, or an adhesive coupling. As shown in the normal state of FIG. 6A, the valve 605A allows flow between the vessel portions V1, V2 because a pressure differential (e.g., P1=P2) is effectively equal between the vessel portions V1, V2. As shown in FIG. 6B, when the rupture 522A occurs in the vessel portion V1, the valve 605A impedes the fluid flow from the vessel portion V2 to the vessel portion V1 to limit loss of fluid due to a leak 524 in the vessel portion V1 through the rupture 522A. In a similar manner, and as shown in FIG. 6C, when the rupture 522B occurs in the vessel portion V2, the valve 605A impedes the fluid flow from the vessel portion V1 to the vessel portion V2 to limit loss of fluid due to the leak 524 in the vessel portion V2. The valve 605A can be any suitable type of valve sufficient to prevent the leak 524 from inhibiting operation of whichever of the vessel portion V1, V2 is adjacent to the other vessel portion V1, V2 that includes the leak 524.

The valve 605A includes a chamber 626 having a first opening 628 and a second opening 630 that allow the flow of fluid between the vessel portions V1, V2. One or more flow impeders 632A, 632B are included in the bend portion 510A, and the flow impeders 632A, 632B are configured to move and/or inhibit flow through one of the first or the second openings 628, 630 based on a pressure differential (e.g., P1<<P2 or P1>>P2) or a fluid flow between the vessel portions V1, V2 surpassing, traversing, or otherwise exceeding a fluid flow threshold. The fluid flow threshold can be based on a magnitude of flow between the vessel portions V1, V2 or a difference in pressure between the vessel portions V1, V2. The flow impeders 632A, 632B are attached to each other through use of resilient members 634A, 634B that extend through the bend portion 510A. The resilient members 634A, 634B are also attached to each other and have adjustable lengths based on compression and expansion and, for example, are formed as springs. The resilient members 634A, 634B are tuned to allow the flow impeders 632A, 632B to move at a specified pressure differential (e.g., P1<<P2 or P1>>P2), a specified magnitude of a leak or rupture, or a specified flow rate between the vessel portions V1, V2 to block the first or the second openings 628, 630 and to stop fluid flow between the vessel portions V1, V2.

As shown in FIG. 6A, when the pressure P1 in the vessel portion V1 is equal to the pressure P2 in the vessel portion V2 (e.g., no flow, substantially no flow, a static condition, or a fill condition), the flow impeders 632A, 632B do not move to a position to block the first opening 628 or the second opening 630. If the storage system 10 is being filled with compressed fluid and P1 is not substantially higher than P2 (e.g., P1>P2), the flow impeders 632A, 632B can be tuned so that that the resilient members 634A, 634B do not allow the flow impeders 632A, 632B to inhibit flow through the first or the second openings 628, 630. In such a state (e.g., a fill state or a normal state), the flow rate between the vessel portions V1, V2 is not zero, but the flow rate is not high enough to move either of the flow impeders 632A, 632B into a blocking position.

During the fill state or a discharge state (i.e., a controlled release of compressed fluids), the rate of filling or discharge may be limited to avoid temperature of the pressure vessel 502 being above or below a predetermined range. The temperature inside the pressure vessel 502 may be achieved during the fill state or the discharge state as a function of a rate at which the pressure vessel 502 is filled or discharged. If the temperature of the pressure vessel 502 is above or below the predetermined range, the pressure vessel 502 may be damaged and cause one or more vessel portions (e.g., V1, V2, V3, V4) to be compromised. Accordingly, the flow impeder 632A, 632B may be tuned to prevent the pressure vessel 502 from being filled or discharged above a threshold rate so that the temperature of the pressure vessel 502 is not above or below the predetermined range. For example, when the threshold rate of filling or discharging is exceeded, the flow impeder 632A, 632B may block the first and/or second openings 628, 630, depending on a direction of fluid flow, to avoid an undesirable raising or lowering of the temperature outside the predetermined range. The threshold rate may be about 0 grams per second to about 25 grams per second. Regarding temperature, the predetermined range may be about −40 degrees Celsius to about 85 degrees Celsius. In addition, by limiting the threshold rate of filling or discharging, an extreme discharge of fluids may be avoided at a leak that is unknown and present in the pressure vessel 502 when the pressure vessel 502 is being initially filled or discharged.

The resilient members 634A, 634B can have any configuration or connection means to the liner 514 sufficient to connect the flow impeders 632A, 632B such that the first or the second opening 628, 630 are blockable when the ruptures 122A, 122B occur. Except at the first and the second openings 628, 630, fluids are prevented from flowing between the vessel portions V1, V2 by the flow impeders 632A, 632B when one of the ruptures 122A, 122B has occurred in either of the vessel portions V1, V2.

For example, as shown in FIG. 6B, when the rupture 522A occurs in the vessel portion V1, the pressure P1 in the vessel portion V1 drops, causing an increased flow rate and pressure differential between the vessel portions V1, V2. Almost instantaneously, a specified pressure differential (e.g., P1<<P2) or flow rate is created that exceeds a specified, predetermined threshold (e.g., a fluid flow threshold) sufficient to overcome inertia of the resilient member 634B, and the resilient member 634B compresses such that the flow impeder 632A moves toward and closes the second opening 628 (i.e., in a blocking position). With this technique, the vessel portion V2 is sealed off from the rupture 522A in the vessel portion V1 to minimize a volume of the leak 524 and maintain operation of the storage system 10.

In another example, as shown in FIG. 6C, when the rupture 522B occurs in the vessel portion V2, the pressure P2 in the vessel portion V2 drops, which causes an increased flow rate and pressure differential between the vessel portions V1, V2. Almost instantaneously, a specified pressure differential (e.g., P1>>P2) or flow rate will exceed a specified, predetermined threshold (e.g., a fluid flow threshold) sufficient to overcome inertia of the resilient member 634A, and the resilient member 634A compresses such that the flow impeder 632A moves toward and closes the first opening 628 (i.e., in a blocking position). With this technique, the vessel portion V1 is sealed off from the rupture 522B in the vessel portion V2 to minimize a volume of the leak 524 and maintain operation of the storage system 10.

Figure 7:
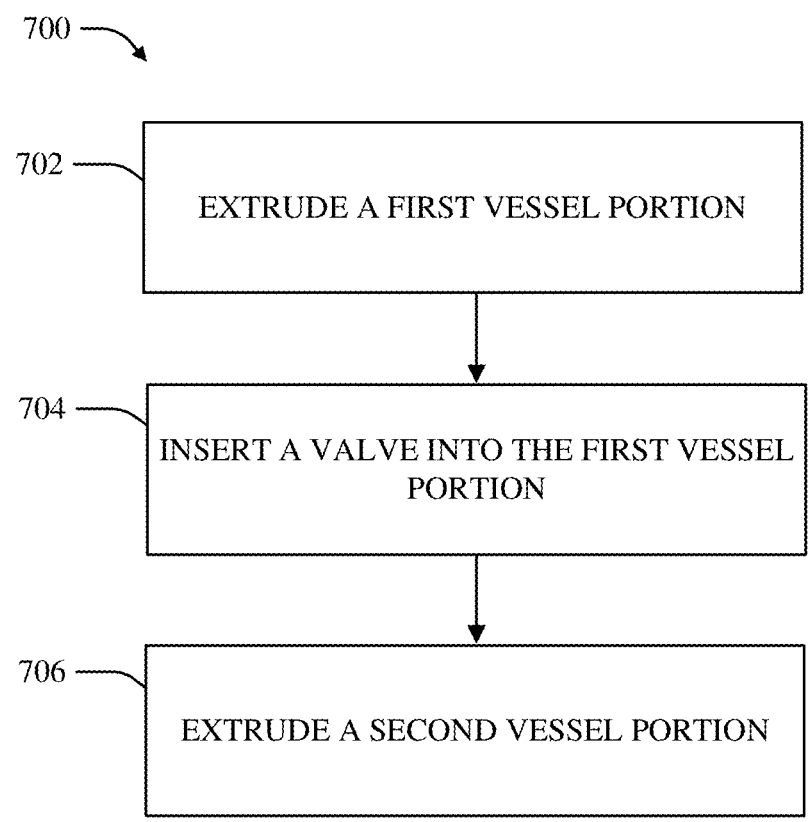
FIG. 7 illustrates a flow chart of a method of manufacturing a storage system.

FIG. 7 illustrates a flow chart of a method 700 of manufacturing a storage system, such as the storage systems 10 and 50 of FIGS. 1 and 5 and including any of the valves 200A, 200B, 200C, 300, 400, 505A, 505B, 505C, or 605A of FIGS. 1-6C, as described herein. In other examples, the method 700 can be used with other storage systems and valves, and the storage systems and valves described herein can be manufactured by other methods besides the method 700.

Operation 702 of the method includes providing, receiving, making, or manufacturing vessel portions of a pressure vessel device. In some examples, operation 702 can include extruding at least one or a first vessel portion. In other examples, extruding at least one vessel portion includes simultaneously inserting a valve into the extruded vessel portion so that as the vessel portion is extruded a valve is already positioned within the vessel portion. In some examples, the vessel portions may be extruded as longitudinal sections, bend sections, or both. The longitudinal or bend sections may be formed in any pattern sufficient to form the pressure vessel device, such as an alternating pattern of bend sections and longitudinal sections so that a storage system is formed with longitudinal sections that are stackable.

Operation 704 includes inserting a valve into the first vessel portion or between vessel portions (i.e., when there are two or more vessel portions). The valve can have any property or configuration as described in relation to valves 200A, 200B, 200C, 300, 400, 505A, 505B, 505C, or 605A of FIGS. 1-6C. In some examples, operation 704 can include inserting the valve into the pressure vessel device during the operation of extruding the pressure vessel device. In other examples, the valve can be inserted into another longitudinal section of the pressure vessel device present between the first vessel portion and the second vessel portion, or the valve can be inserted into a bend section between two of the longitudinal sections of the pressure vessel device to separate the first vessel portion and the second vessel portion. As an extra reinforcement means to prevent a leak of fluid, inserting the valve into the pressure vessel device can include coupling the valve to a liner and inserting the liner into the pressure vessel device with or without an additional reinforcement layer.

Operation 706 can include extruding another vessel portion that is not connected with the valve, for example, a second vessel portion. Operation 706 may include similar additional steps that have been described in relation to operation 702. Operations 702, 704, 706 can be repeated until the desired number of vessel portions and/or valves are manufactured or produced. Further operations (not shown) of the method 700 can include securing an end fitting to the pressure vessel device, such as end fittings 106, 108 of FIG. 1, or adding inlets, outlets, or auxiliary fluid connections, such as the auxiliary fluid connection of FIG. 1, or including any combination thereof to provide a terminal portion(s) of the storage system that controls fluid flow entering and exiting the storage system that includes the pressure vessel device.

Figure 8A:
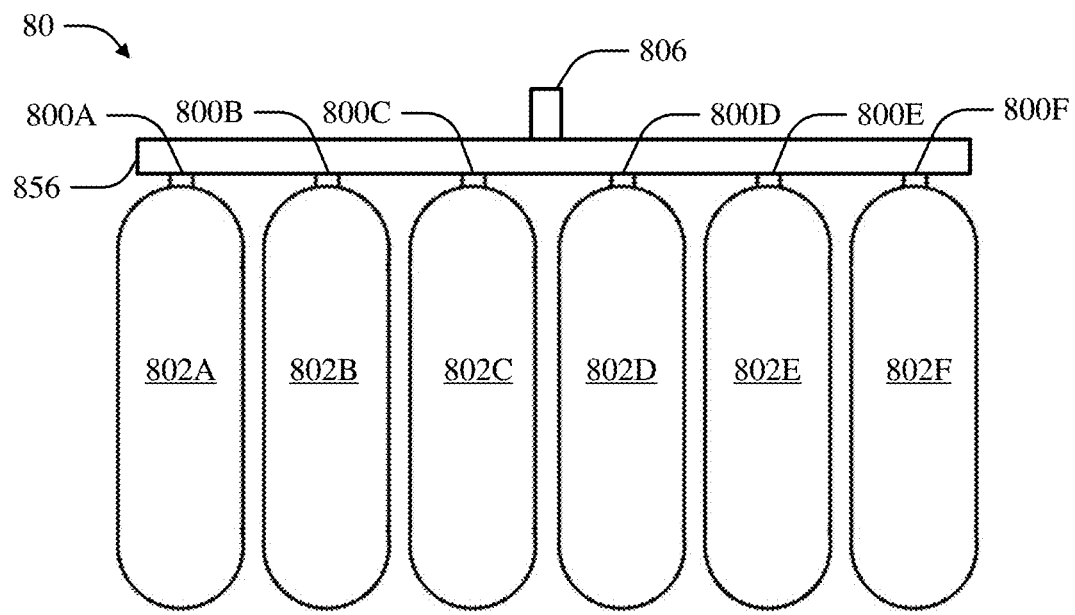
FIG. 8A is a side view of another example of a storage system.
Figure 8B:
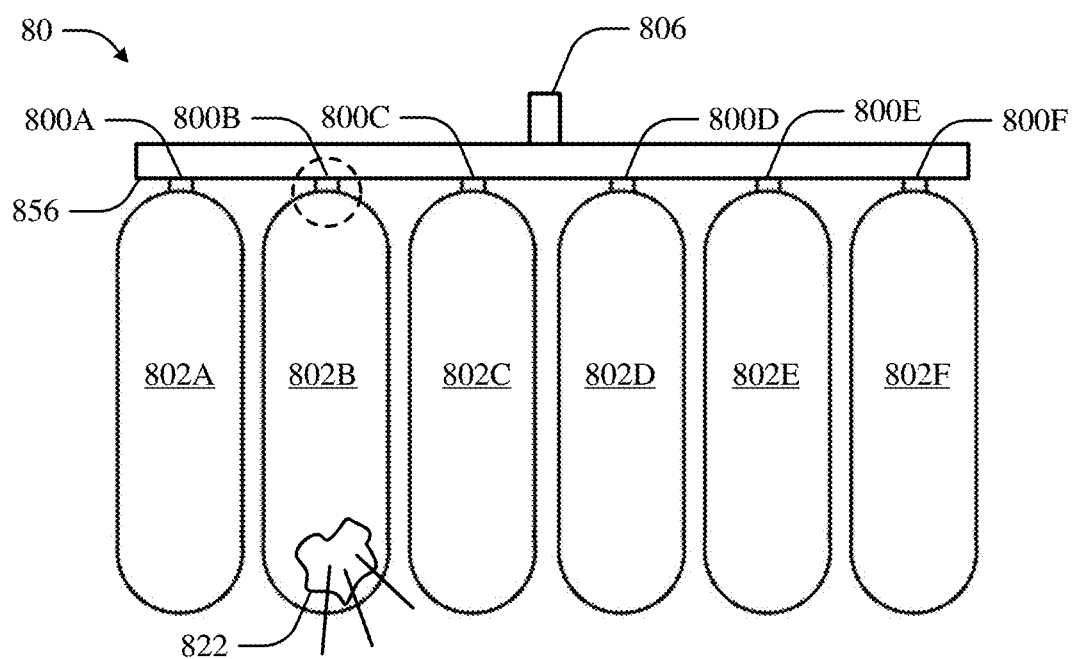
FIG. 8B is a side view of the storage system of FIG. 8A that illustrates a leak.

FIG. 8A is a side view of another example of a storage system 80. FIG. 8B is a side view of the storage system 80 of FIG. 8A that illustrates a leak. The storage system 80 includes valves 800A, 800B, 800C, 800D, 800E, 800F and pressure vessels 802A, 802B, 802C, 802D, 802E, 802F designed to control and store compressed fluid. Any of the features disclosed with respect to the storage systems 10, 50 of FIGS. 1 and 2, including the valves 200A, 200B, 200C, 300, 400, 505A, 505B, 505C, or 605A of FIGS. 1-6C described herein may be used with the storage system 80.

The storage system 80 includes the pressure vessels 802A, 802B, 802C, 802D, 802E, 802F designed to receive and store a fluid in a compressed state. Any number and any type of pressure vessels, portions, or sections may be provided. Each of the pressure vessels 802A, 802B, 802C, 802D, 802E, 802F can include a separate pressure vessel, such as a traditional non-conformable cylindrical pressure vessel, and may include any type of pressure vessel described herein. In addition, aspects described herein can be employed in other types of compressed gas storage systems having a plurality of pressure vessels, pressure vessel portions, or pressure vessel sections.

The storage system 80 includes end fitting 806 that connect the pressure vessels 802A, 802B, 802C, 802D, 802E, 802F to valves, adapters, plugs, or couplings and assist in containing compressed fluid within the pressure vessels 802A, 802B, 802C, 802D, 802E, 802F. In other examples, mechanisms are included for releasing the compressed fluid in the event of a safety issue, such as a pressure relief device (not shown). The end fitting 806 can be employed as inlets or outlets to receive the intake or discharge of fluid in or out of the pressure vessel. The end fitting 806 may be connected so that in the event of a leak at one of the pressure vessels 802A, 802B, 802C, 802D, 802E, 802F, valves 800A, 800B, 800C, 800D, 800E, 800F, or any other portion of the storage system 80, the end fitting 806 can still fluidly communicate.

The pressure vessels 802A, 802B, 802C, 802D, 802E, 802F are fluidly coupled to a manifold 856 with the valves 800A, 800B, 800C, 800D, 800E, 800F located between respective pressure vessels 802A, 802B, 802C, 802D, 802E, 802F and the manifold 856. In the present example, the valves 800A, 800B, 800C, 800D, 800E and 800F are two way check valves, and in other examples, instead of a two-way check valve, the storage system 80 can include two one-way check valves (not shown) that independently control flow in different and/or opposite directions.

As illustrated in FIG. 8B, in the event of a rupture 822, the valve 800B automatically closes off fluid communication between the pressure vessel 802B and the manifold 856 and the rest of the pressure vessels 802A, 802C, 802D, 802E, 802F, which leaves the pressure vessels 802A, 802C, 802D, 802E, 802F in fluid communication with the end fitting 806 and each other (i.e., the other pressure vessels 802A, 802C, 802D, 802E, 802F) because of the fluid pathway provided by the manifold 856. As a result, only the fluid in the affected pressure vessel 802B is subject to being lost or released through the rupture 822, and the fluid in the pressure vessels 802A, 802C, 802D, 802E, 802F is retained and accessible through the end fitting 806.

Figure 9A:
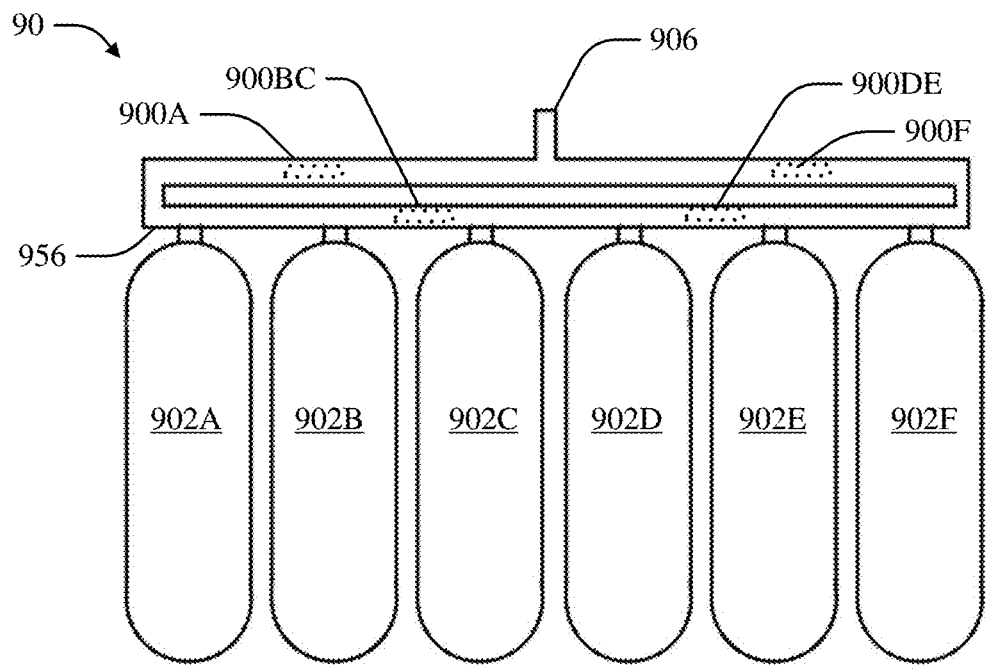
FIG. 9A is a side view of another example of a storage system.
Figure 9B:
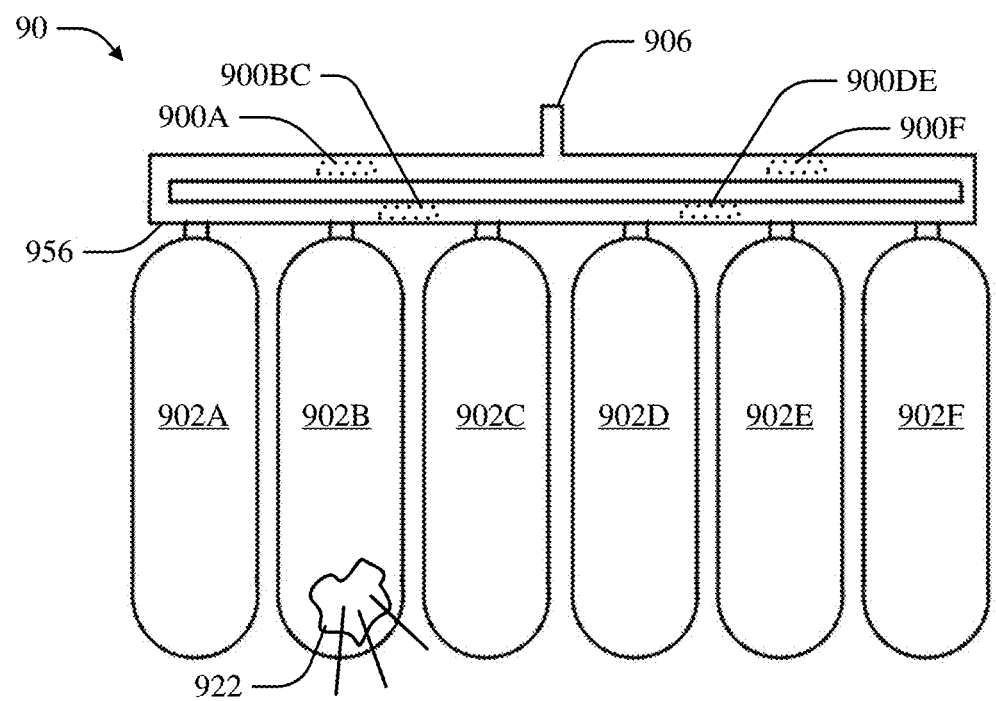
FIG. 9B is a side view of the storage system of FIG. 9A that illustrates a leak.

FIG. 9A is a side view of another example of a storage system 90, which may be similar to the storage systems 10, 50, 80 of FIGS. 1, 5, and 8. FIG. 9B is a side view of the storage system 90 of FIG. 9A that illustrates a leak. In this example, valves 900A, 900BC, 900DE, 900F, which may be similar to the valves 200A, 200B, 200C, 300, 400, 505A, 505B, 505C, 605A, 800A, 800B, 800C, 800D, 800E, 800F of FIGS. 1-8B, connect pressure vessels 902A, 902B, 902C, 902D, 902E, 902F, which may be similar to the pressure vessels 102, 502, 802A, 802B, 802C, 802E, 802F of FIGS. 1-8B, to end fitting 906. In the event of a rupture 922, a manifold 956 containing the valves 900A, 900BC, 900DE, 900F allows fluid to flow between specific ones of the pressure vessels 902A, 902B, 902C, 902D, 902E, 902F that are not impacted by the rupture 922.

For example, a manifold 956 provides a circular (e.g., continuous) pathway between the pressure vessels 902A, 902B, 902C, 902D, 902E, 902F. Instead of a valve for every pressure vessel 902A, 902B, 902C, 902D, 902E, 902F (e.g., the valves 800A, 800B, 800C, 800D, 800E, 800F of FIGS. 8A-8B), the number of the valves 900A, 900BC, 900DE, 900F is reduced by positioning the valves 900A, 900BC, 900DE, 900F within the manifold 956 at key positions to separate the pressure vessels 902A, 902B, 902C, 902D, 902E, 902F. For example, the pressure vessels 902A, 902B are separated from pressure vessel 902C by the valve 900BC and separated from the other pressure vessels 902C, 902D, 902E, 902F by the valve 900A. A benefit of the storage system 90 is the reduction in cost by minimizing the number of valves 900A, 900BC, 900DE, 900F utilized while also reducing the number of pressure vessels 902A, 902B, 902C, 902D, 902E, 902F affected by the rupture 922 over a conventional system, and thus, the amount of fluid lost in through the rupture 922 is significantly less as compared to conventional systems that lack any coordinated valve system.

In the event of the rupture 922, the valves 900A, 900BC can close off fluid communication between the pressure vessels 902A, 902B and the rest of the storage system 90, leaving the pressure vessels 902C, 902D, 902E, 902F in fluid communication with the end fitting 906 and each other via the manifold 956. As a result, only the fluid in the affected pressure vessel 902B and any other pressure vessels (e.g., pressure vessel 902A) in fluid communication with pressure vessel 902B may be lost through the rupture 922. In this example, the fluid lost through the rupture 922 is limited to the fluid in the pressure vessels 902A, 902B.

As an additional measure to slow the loss of fluid, any one of the pressure vessels 902A, 902B, 902C, 902D, 902E, 902F can include an individual valve (e.g., the valves 800A, 800B, 800C, 800D, 800E, 800F of FIGS. 8A-8B) to prevent the loss of fluids from a rupture in a pressure vessel that is adjacent. In the example of FIG. 9B, if the pressure vessel 902A and/or the pressure vessel 902B included a valve (not shown) separating the pressure vessel 902A and/or the pressure vessel 902B from the manifold, the rupture 922 would not cause a leak in the pressure vessel 902A that is adjacent. With this technique, an operator could attempt to save the compressed fluids in the pressure vessel 902A (or 902B) that is not ruptured and would thus avoid having undesirable and additional fluids leak into the surrounding environment from the rupture 922.

While the aspects described herein describe simple and reliable mechanical valve examples, electro-mechanical valves in electrical communication with one or more sensors or circuitry including processing circuitry could also be provided within the scope of this disclosure. Any of the valves described herein can have automatic functionalities to close leaking vessel sections that are activated through electronic or electromechanical means.

As described herein, the terms gas and fluid may be used interchangeably to define any type of fluid composition. The gases or fluids may be described as compressed or uncompressed and the examples described herein are designed to prevent loss of compressed or uncompressed gas or fluid. The description of gases or fluids as under pressure is described as being relative to an ambient pressure external to at least one pressure vessel or any other component described herein. The systems described herein are generally configured to operate at increased pressure as compared to ambient pressure, such as during pressure differentials in a range of 1-1000 pascals (Pa). In some examples, the systems described herein are generally configured to operate in a high-pressure range of 20-90 pascals (Pa).

As described herein, a storage system may be a compressed gas storage system, a fluid storage system, a conformable storage system, a non-conformable storage system, or any other storage system designed to hold gases or fluids in a compressed state. As described herein, the term fluidly coupled or in fluid communication with can be defined as having the fluid contents of two or more components being intermixable with each other. For example, fluidly coupled can include a mechanical coupling that allows communication of fluids, including gaseous substances and particulate matter, within and between components. As another example, the contents (or a portion of the contents) of a first component or first portion of a component, can be "in fluid communication" with the contents (or a portion of the contents) of a second component or second portion of a component. A vessel portion may be described as a first vessel portion, a second vessel portion, a third vessel portion, a fourth vessel portion, or any number of a vessel portion sufficient to form a storage system.

The above description is intended to be illustrative, and not restrictive. For example, the above-described examples (or one or more aspects thereof) may be used in combination with each other. Other examples can be used, such as by one of ordinary skill in the art upon reviewing the above description. In the description, various features may be grouped together to streamline the disclosure. This should not be interpreted as intending that an unclaimed disclosed feature is essential to any claim. Rather, novel and inventive subject matter may lie in less than all features of a particular disclosed example.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Any directional descriptors described herein can be interpreted as being used with their normal and customary use in the art. Relative terms, such as, "substantially" "almost" or "about" may be used to indicate a possible variation, for example, of 10% in a stated numeric value, manufacturing, design variation, or maximum pressure loss.

What is claimed is:

1. A compressed gas storage system, comprising:
   a pressure vessel device including a first vessel portion in fluid communication with a second vessel portion; and
   a valve separating the first vessel portion and the second vessel portion, the valve comprising:
      a first wall defining a first opening;
      a second wall defining a second opening; and
      a flow impeder connected with an inner surface of the pressure vessel device and configured to block the first opening or the second opening depending on a state of fluid flow between the first vessel portion and the second vessel portion.

2. The compressed gas storage system of claim 1, wherein the first wall is located between the first vessel portion and the flow impeder, and wherein the second wall is located between the second vessel portion and the flow impeder.

3. The compressed gas storage system of claim 1, wherein the valve is configured to allow flow during a fill state, a discharge state, and a normal state, wherein the fill state is a state where fluids are being filled into the pressure vessel device, wherein the discharge state is a state where fluids are being discharged from the pressure vessel device, wherein the normal state is a state where fluids are contained within the first and second pressure vessel portions and no filling, discharging, or leaking is occurring in the compressed gas storage system, and wherein during the fill and/or discharge state, the flow impeder is configured to prevent filling or discharging above a threshold rate of about 0 grams per second to about 25 grams per second so that temperature of the pressure vessel device is not above or below a predetermined range of about −40 degrees Celsius to about 85 degrees Celsius.

4. The compressed gas storage system of claim 1, wherein the flow impeder has a first state that impedes fluid flow from the second vessel portion to the first vessel portion when a leak having a first specified magnitude occurs in the first vessel portion, and
   wherein the flow impeder has a second state that impedes fluid flow from the first vessel portion to the second vessel portion when a leak having a second specified magnitude occurs in the second vessel portion.

5. The compressed gas storage system of claim 1, further comprising:
   a resilient member coupled to the flow impeder and the inner surface of the pressure vessel device, configured to allow movement of the flow impeder at a first specified pressure difference to the first opening, configured to allow movement of the flow impeder at a second specified pressure difference to the second opening, and configured to restrict movement of the flow impeder between the first opening and the second opening at a third specified pressure difference, wherein the first, second, and third specified pressure differences have different values.

6. The compressed gas storage system of claim 1, wherein when a leak occurs in the first vessel portion or the second vessel portion, the flow impeder is caused to block the first opening when the leak occurs in the first vessel portion and the second opening when the leak occurs in the second vessel portion.

7. The compressed gas storage system of claim 1, wherein the pressure vessel device includes a third vessel portion, and
wherein another valve is positioned between the second vessel portion and the third vessel portion, the other valve capable of blocking or allowing fluid flow between the second vessel portion and the third vessel portion.

8. A compressed gas storage system, comprising:
a first vessel portion;
a second vessel portion; and
a bent portion that fluidly connects the first and second vessel portions, the bent portion comprising:
  a chamber that connects with the first vessel portion at a first opening and with the second vessel portion at a second opening;
  a first flow impeder disposed within the chamber at a location proximate to the first opening and configured to selectively move in and out of a first blocking position that closes the first opening; and
  a second flow impeder disposed within the chamber at another location proximate to the second opening and configured to selectively move in and out of a second blocking position that closes the second opening,
  wherein the first and second flow impeders are configured to prevent fluid communication through the chamber between the first and second vessel portions when in the first and second blocking positions at the respective first and second openings.

9. The compressed gas storage system of claim 8, wherein the bent portion further comprises:
a first resilient member that connects the first flow impeder to the chamber; and
a second resilient member that connects the second flow impeder to the chamber.

10. The compressed gas storage system of claim 9, wherein the first and second resilient members are connected to each other and the chamber at a point halfway between the first vessel portion and the second vessel portion.

11. The compressed gas storage system of claim 9, wherein the first resilient member is configured to compress and expand as the first flow impeder selectively moves in and out of the first blocking position.

12. The compressed gas storage system of claim 11, wherein the second resilient member is configured to compress and expand as the second flow impeder selectively moves in and out of the second blocking position.

13. The compressed gas storage system of claim 8, wherein:
the first flow impeder is configured to move into the first blocking position when a pressure within the second vessel portion drops below a pressure threshold value; and
the second flow impeder is configured to move into the second blocking position when a pressure within the first vessel portion drops below a pressure threshold value.

14. The compressed gas storage system of claim 8, wherein the first flow impeder has a greater diameter than a diameter of the first opening, and wherein the second flow impeder has a greater diameter than a diameter of the second opening.

15. The compressed gas storage system of claim 14, wherein the diameters of the first and second vessel portions are greater than a diameter of the chamber of the bent portion.

16. The compressed gas storage system of claim 8, wherein the first and second vessel portions have a linear shape and are in stacked contact with each other.

17. A compressed gas storage system, comprising:
a first pressure vessel configured to contain fluids;
a second pressure vessel configured to contain fluids;
a third pressure vessel configured to contain fluids;
an outlet in fluid communication with and configured to release fluid from the first, second, and third pressure vessels; and
a manifold in fluid communication with the outlet and the first, second, and third pressure vessels;
a first valve positioned within the manifold at a location between the first and second pressure vessels and configured to block fluid communication between the first and second pressure vessels when pressure drops in either of the first or second pressure vessels;
a second valve positioned within the manifold at a location between the first and third pressure vessels and configured to block fluid communication between the first and third pressure vessels when pressure drops in either of the first or third pressure vessels; and
a third valve positioned within the manifold at a location between the second and third pressure vessels and configured to block fluid communication between the third and second pressure vessels when pressure drops in either of the third or second pressure vessels.

18. The compressed gas storage system of claim 17, wherein the manifold comprises:
a first channel positioned between the first valve, the second valve, and the first pressure vessel;
a second channel positioned between the first valve, the third valve, and the second pressure vessel; and
a third channel positioned between the second valve, the third valve, and the third pressure vessel.

19. The compressed gas storage system of claim 18, further comprising:
a fourth valve positioned within the manifold and at a location between the second valve, the third valve, and the third pressure vessel,
wherein the third channel is positioned between the fourth valve, the second valve, and the outlet, and
wherein the manifold further comprises a fourth channel positioned between the fourth valve, the third valve, and the third pressure vessel.

20. The compressed gas storage system of claim 19, wherein the combination of the first and second valves prevents fluid loss from the second and third pressure vessels when a rupture occurs in the first pressure vessel, wherein the combination of the first and third valves prevents fluids loss from the first and third pressure vessels when a rupture occurs in the second pressure vessel, and wherein the combination of the third and fourth valves prevents fluid loss from the first and second pressure vessels when a rupture occurs in the third pressure vessel.

\* \* \* \* \*